(No Model.)
T. SANDS.
Holder or Clip for Ice Cream Freezers.
No. 239,674. Patented April 5, 1881.
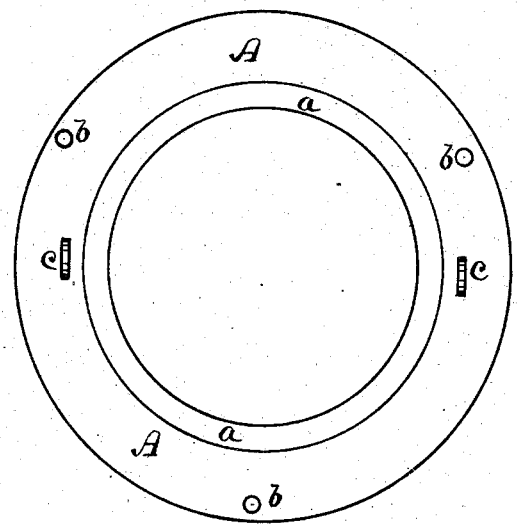
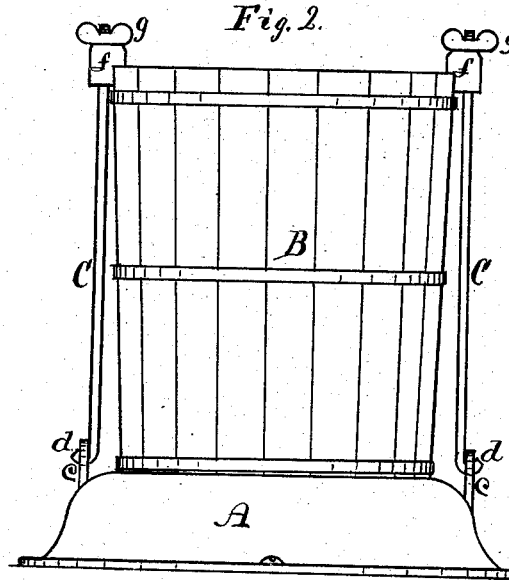
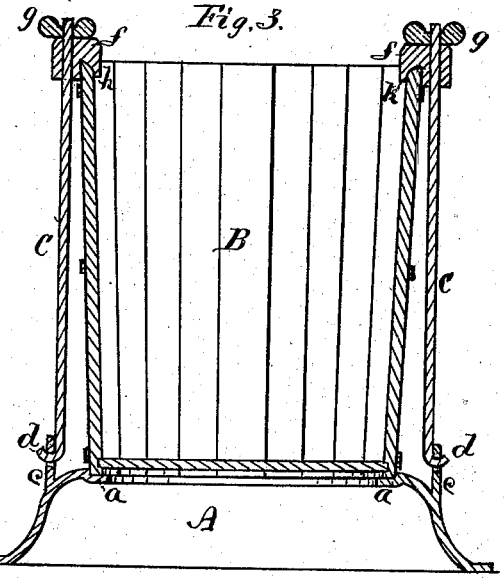
Witnesses:
Inventor:
Thomas Sands,
By his attorney,
J. S. Brown

UNITED STATES PATENT OFFICE.

THOMAS SANDS, OF LACONIA, NEW HAMPSHIRE.

HOLDER OR CLIP FOR ICE-CREAM FREEZERS.

SPECIFICATION forming part of Letters Patent No. 239,674, dated April 5, 1881.

Application filed April 5, 1880. (No model.)

*To all whom it may concern:*

Be it known that I, THOMAS SANDS, of Laconia, in the county of Belknap and State of New Hampshire, have invented a Holder for Portable Ice-Cream Freezers; and I do hereby declare that the following is a full and exact description thereof, reference being had to the accompanying drawings, making part of this specification—

Figure 1 being a top view of the base or main part of the holder; Fig. 2, a side view of the holder complete, and represented as holding the tub of an ice-cream freezer; Fig. 3, a central vertical section of the same.

Like letters designate corresponding parts in all of the figures.

The purpose of my invention is to produce a holder for ice-cream freezers, especially hand-freezers, so as to keep them firmly in place while freezing the cream.

Such ice-cream freezers as are now generally made have their driving-gear mounted on the tub of the freezer, and the whole being quite light, it is somewhat difficult, or at least troublesome, to hold the tub in position while turning the crank to operate the machine, especially when the freezing is nearly completed, and the power required is considerable.

My invention obviates all the difficulty in holding the freezer steady, while it does not materially detract from the portable character of the machine, since the latter is readily attached to and detached from the holder, and the holder itself may be removable from one place and secured in another without much trouble whenever necessary or desired.

I make a base, A, which may be of cast-iron, and preferably of annular form, and I form at the inner edge or periphery thereof a depressed ledge or rabbet, a, or its equivalent, such as projections arranged in a circle, to receive the lower edge of the freezer-tub B, and retain the same in a central position on the base, which is to be secured to the floor, bench, table, or other support by bolts or screws passed down through holes b b in its supporting-flange. It also has two or more loops, ears, or their equivalent, c c, which receive and hold hooks or projections d d of hook bolts or rods C C, which extend up therefrom at the sides of the freezer-tub and a little above the same, and on the upper parts thereof slide clip-pieces or hooks f f, which are adjustable in height by means of thumb screws or nuts g g, screwing upon the screw-threaded upper portions of the bolts or rods, or by any equivalent means, such as keys or wedges. The clip-pieces f f have hooks or lips h h, that extend in and hold upon the upper edge of the freezer-tub, substantially as represented. Thus, by turning down the thumb-screws g g upon these clip-pieces when once in place, they are tightened upon the tub and hold it securely on the base A, and the tub is again readily removed by turning the thumb-screws back a few turns to set it free, when it can be lifted from the holder without hinderance.

This holder is simple and inexpensive, and it is effectual for its purpose.

What I claim as my invention, and desire to secure by Letters Patent, is—

1. The combination of the base A, provided with means for attaching it to a floor or support, and the hook bolts or rods C C, provided with adjustable hooks or clip-pieces f f, substantially as and for the purpose herein specified.

2. A holder for ice-cream freezers, composed of a base, A, adapted to hold the freezer-tub in place, and provided with means for securing it in a fixed position on the floor or support, and clip rods or bolts C C, provided with adjustable hooks or clip-pieces to take and hold upon the upper edge of the tub, substantially as and for the purpose herein specified.

The foregoing specification signed by me this 31st day of January, 1880.

THOMAS SANDS.

Witnesses:
J. S. BROWN,
JOHN T. ARMS.